(12) United States Patent
Hemphill et al.

(10) Patent No.: US 9,938,753 B1
(45) Date of Patent: Apr. 10, 2018

(54) LOCK MECHANISM ASSEMBLY FOR VEHICLE TAILGATE

(71) Applicant: Ford Global Technologies, LLC, Dearborn, MI (US)

(72) Inventors: Joshua Robert Hemphill, White Lake, MI (US); Jack Marchlewski, Saline, MI (US); Dragan B. Stojkovic, Taylor, MI (US); Robert Reiners, Grosse Ile, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/417,447

(22) Filed: Jan. 27, 2017

(51) Int. Cl.
*B62D 33/03* (2006.01)
*B62D 33/037* (2006.01)
*E05B 77/44* (2014.01)

(52) U.S. Cl.
CPC .............. *E05B 77/44* (2013.01); *B62D 33/03* (2013.01); *B62D 33/037* (2013.01)

(58) Field of Classification Search
CPC .. B62D 33/0273; B62D 33/03; B62D 33/037; E05B 77/44
USPC .................. 296/57.1; 292/DIG. 29
See application file for complete search history.

(56) References Cited

U.S. PATENT DOCUMENTS

| | | | |
|---|---|---|---|
| 4,981,320 A | 1/1991 | Bowman | |
| 5,004,287 A * | 4/1991 | Doyle | B62D 33/0273 16/260 |
| 5,280,986 A * | 1/1994 | Friesen | B62D 33/0273 292/278 |
| 5,823,022 A | 10/1998 | Barker | |
| 9,174,684 B1 * | 11/2015 | Waskie | E05C 17/30 |
| 9,278,718 B1 | 3/2016 | Cooper et al. | |
| 2004/0145207 A1 * | 7/2004 | Lisk, III | B60P 1/26 296/50 |
| 2006/0202500 A1 * | 9/2006 | Eschebach | B62D 33/0273 296/57.1 |
| 2009/0108613 A1 * | 4/2009 | Krajenke | B62D 33/0273 296/57.1 |
| 2011/0181068 A1 * | 7/2011 | Zielinsky | B60P 1/26 296/57.1 |
| 2016/0177612 A1 * | 6/2016 | Buchheim | E05F 5/025 296/50 |
| 2017/0009508 A1 * | 1/2017 | Hunt | E05F 15/627 |
| 2017/0089116 A1 * | 3/2017 | Heiberger | E05F 15/614 |
| 2017/0166265 A1 * | 6/2017 | Estrada | B62D 33/037 |
| 2017/0183903 A1 * | 6/2017 | Schwendemann | E05F 15/63 |

* cited by examiner

*Primary Examiner* — Gregory A Blankenship
(74) *Attorney, Agent, or Firm* — Jason C. Rogers; Brooks Kushman P.C.

(57) ABSTRACT

A check strap assembly for a pickup truck tailgate may include a truck bed, a tailgate, and opposing side panels. The tailgate is mounted to the truck bed for pivotal movement. The opposing side panels are secured to the truck bed to partially define a truck box when the tailgate is in a closed position. The check strap assembly includes a member extending from a D-pillar of the truck box to the tailgate and a lock mechanism having a component with an overhang to prevent access to a fastener securing the member to the D-pillar or the tailgate. The D-pillar may include a flange defining an aperture and the member may be a rod having a first end sized for extending through the aperture and a second end with a striker for engagement with a latch mechanism of the tailgate.

19 Claims, 3 Drawing Sheets

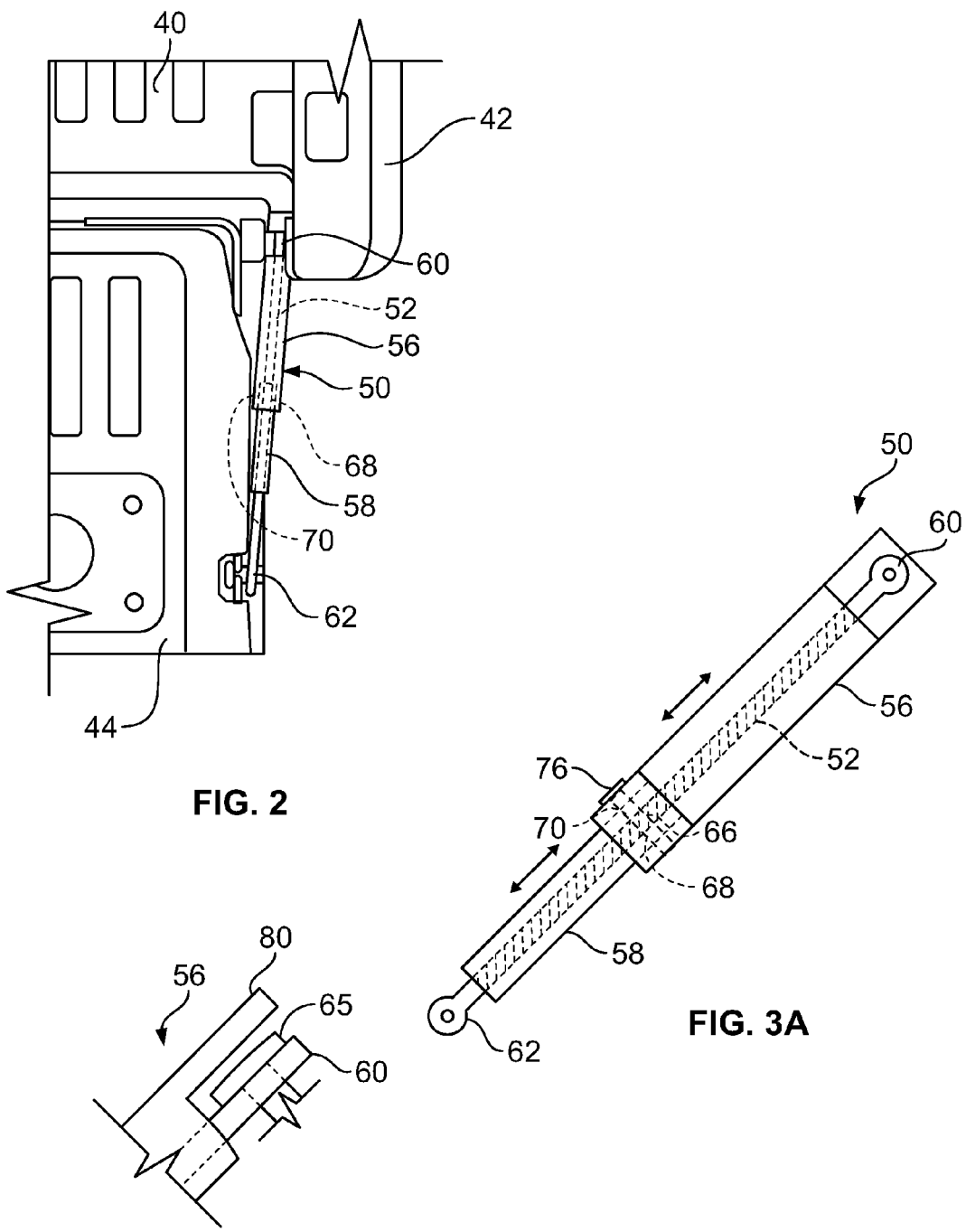

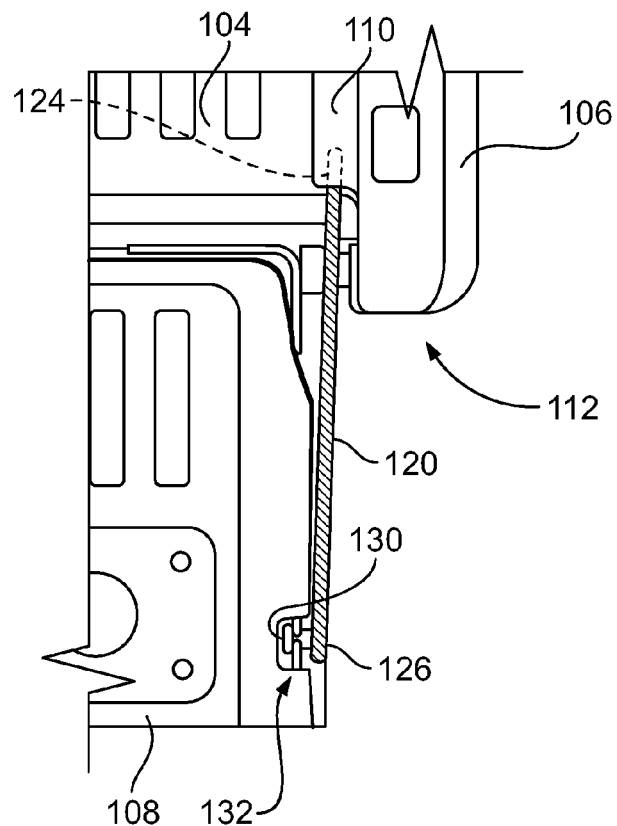
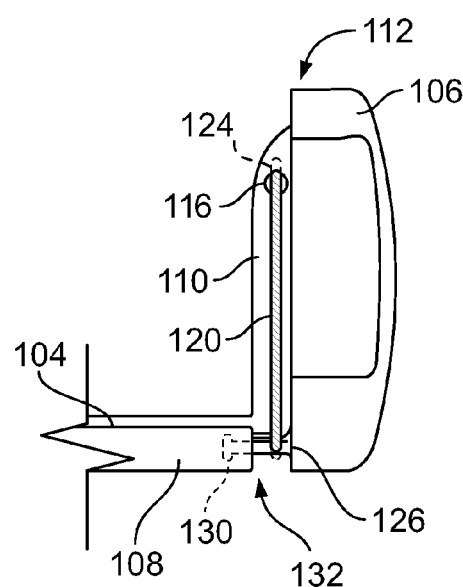
FIG. 4
FIG. 5
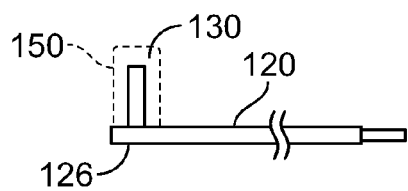
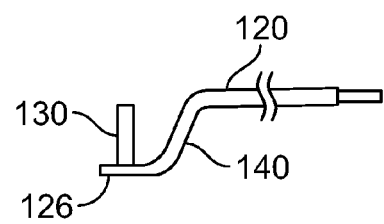
FIG. 6A
FIG. 6B

LOCK MECHANISM ASSEMBLY FOR VEHICLE TAILGATE

TECHNICAL FIELD

This disclosure relates to lock mechanisms for pickup truck tailgate assemblies.

BACKGROUND

Pickup trucks are motor vehicles with a front passenger area, often referred to as a cab, and an open top rear cargo area, often referred to as a truck box. The truck box usually has a substantially flat bed from which two side body panels and a forward interconnecting header extend upwardly from the bed. Pickup trucks may also employ a bottom hinged door, commonly referred to as a tailgate, hinged at the rear edge of the bed and closable to provide a fourth wall for the cargo area. Pickup trucks are often used with the tailgate in an open position for hauling loads. Open tailgates may be more prone to theft without a lock mechanism to secure the tailgate to the truck box when in the open position.

SUMMARY

According to an aspect of the present disclosure, a pickup truck box assembly includes a pickup truck box, a tailgate, a check strap, a first sleeve, and a lock mechanism. The tailgate is mounted for pivotal movement to the pickup truck box. The check strap includes a first end for securing to a D-pillar of the pickup truck box and a second end for securing to the tailgate, and defines a first aperture. The first sleeve defines a first channel to receive a portion of the check strap and a second aperture for substantial registration with the first aperture. The lock mechanism is for securing to the check strap and the first sleeve. The first sleeve is sized for arrangement with the check strap so that the apertures align to receive a portion of the lock mechanism to prevent removal of the tailgate from the pickup truck box. The assembly may include a second sleeve defining a second channel to receive another portion of the check strap and a third aperture for registration with the first aperture and the second aperture. The second sleeve may be sized for partial insertion within the first sleeve. The first sleeve and the second sleeve may be arranged with one another in a telescoping relationship. The first end of the check strap may include an eye-hook for receiving a fastener to secure the first end to the D-pillar. The second end of the check strap may include a striker for engagement with a latch mechanism of the tailgate. One of the ends of the first sleeve may include a flange overhang to prevent access to a fastener securing the first end of the check strap to the D-pillar or a fastener securing the second end of the check strap to the tailgate. The first and second apertures may be sized to receive a lock pin of the lock mechanism to prevent removal of the first sleeve from the check strap.

According to another aspect of the present disclosure, a pickup truck tailgate assembly includes a truck box, a tailgate, and a rod. The truck box has a D-pillar including a flange defining a through-hole. The tailgate is mounted to the truck box for pivotal movement and includes a latch mechanism. The rod includes a first end for inserting through the through-hole and a second end including a rod striker for engagement with the latch mechanism to prevent removal of the tailgate from the truck box when in an open position. The rod may further include a telescoping feature for extension and retraction between at least two configurations. The second end of the rod may be adjustable for engagement alignment with various locations of the latch mechanism. The second end of the rod may include an angled portion to accommodate different size relationships of the D-pillar and the tailgate. The rod may be one of steel and aluminum. The D-pillar may further include a D-pillar striker for engagement with the latch mechanism of the tailgate when the tailgate is in a closed position. The second end of the rod may further include a flange overhang to prevent access to the rod striker.

According to a further aspect of the present disclosure, a check strap assembly for a pickup truck tailgate includes a truck bed, a tailgate, and opposing side panels. The tailgate is mounted to the truck bed for pivotal movement. The opposing side panels are secured to the truck bed to partially define a truck box when the tailgate is in a closed position. The check strap assembly includes a member extending from a D-pillar of the truck box to the tailgate and a lock mechanism having a component with an overhang to prevent access to a fastener securing the member to the D-pillar or the tailgate. The D-pillar may include a flange defining an aperture and the member may be a rod having a first end sized for extending through the aperture and a second end with a striker for engagement with a latch mechanism of the tailgate. The component with an overhang may be a rod in which the overhang extends from the rod to prevent access to a rod striker for securing to a latch mechanism of the tailgate. The member may be a check strap extending from the D-pillar to the tailgate and the component with an overhang may be a first sleeve sized for receiving at least a portion of the check strap. The overhang may extend from the first sleeve to prevent access to a fastener for securing a first end of the check strap to the D-pillar or a second end of the check strap to the tailgate. The assembly may include a second sleeve sized for partial disposal within the first sleeve and to receive a portion of the check strap. The first sleeve, the second sleeve, and the check strap may each define separate apertures for alignment with one another to receive a portion of a lock mechanism. The first sleeve and the second sleeve may be arranged with one another in a telescoping relationship.

The above aspects of the disclosure and other aspects will be apparent to one of ordinary skill in the art in view of the attached drawings and the following detailed description of the illustrated embodiments.

BRIEF DESCRIPTION OF THE DRAWINGS

FIG. 2 is a fragmentary top view of an example of a portion of a pickup truck.

FIG. 3A is a side view of an example of a check strap assembly for a tailgate of a pickup truck.

FIG. 3B is a partial side view of a portion of the check strap assembly of FIG. 3A.

FIG. 4 is a fragmentary top view of an example of a portion of a pickup truck.

FIG. 5 is a rear view of the portion of the pickup truck of FIG. 4.

FIG. 6A is a partial side view of an example of a portion of the check strap assembly of FIG. 4.

FIG. 6B is a partial side view of another example of a portion of the check strap assembly of FIG. 4.

DETAILED DESCRIPTION

Figure 1:
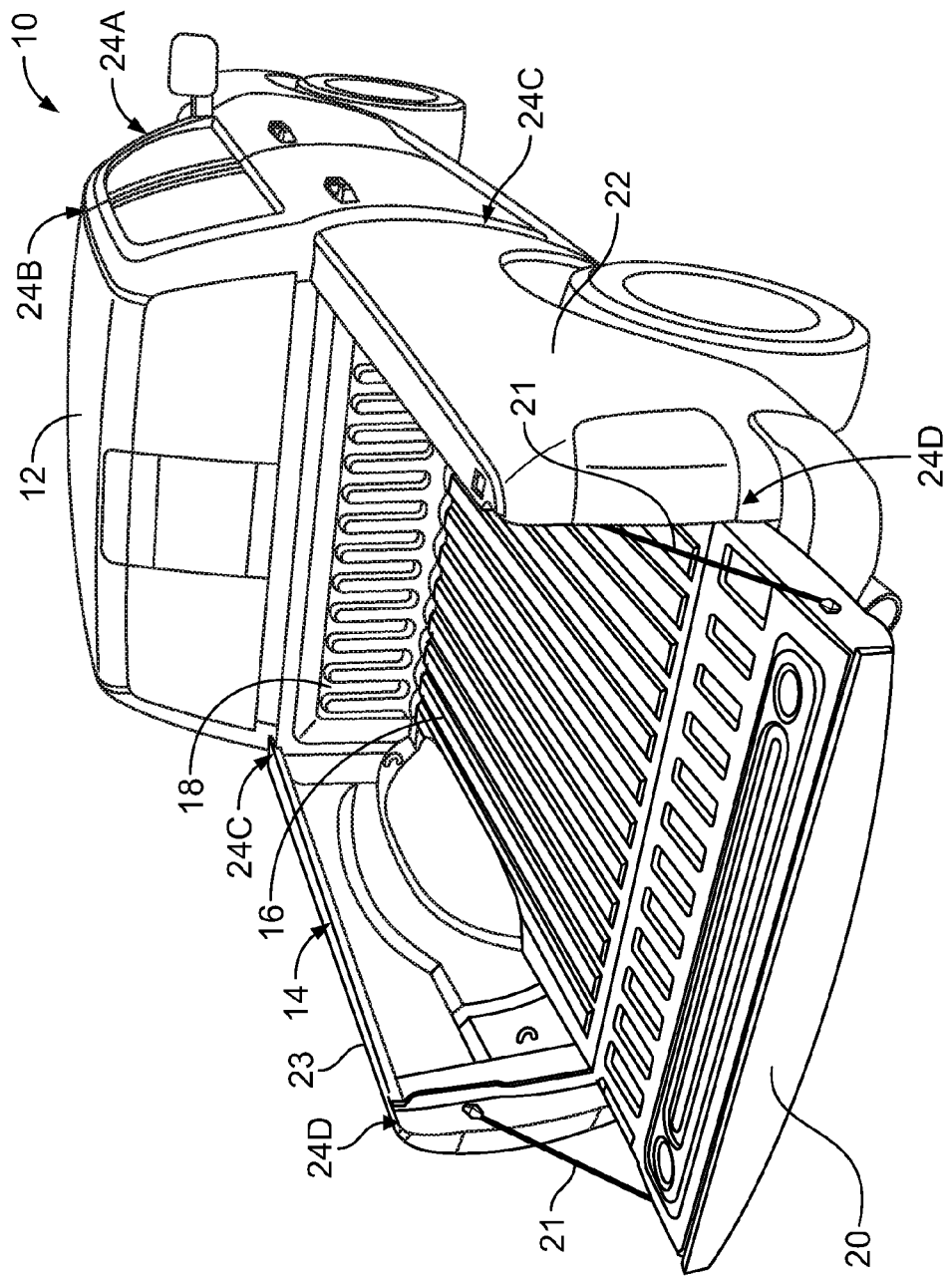
FIG. 1 is a rear perspective view of an example of a pickup truck.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, an example of a vehicle 10 is illustrated that includes a cabin 12 and a truck box 14 supported by a vehicle chassis (not visible in FIG. 1). The vehicle 10 may be, for example, a pickup truck. The truck box 14 includes a bed 16 having a forward end adjacent to the cabin 12 and a rear end opposite the forward end. The bed 16 supports a header 18 at the forward end and a tailgate 20 at the rear end. The tailgate 20 is pivotally mounted to the bed 16. Each of a pair of check straps 21 may be secured to the truck box 14 and the tailgate 20. The check straps 21 provide additional support to the tailgate 20 when receiving a load. Each of the pair of check straps 21 may be removably secured to the truck box 14 and the tailgate 20. The bed 16 also supports a first outer side panel 22 and a second outer side panel 23. In this example, the vehicle 10 includes an A-pillar region 24A, a B-pillar region 24B, a C-pillar region 24C, and a D-pillar region 24D. The illustrated vehicle 10 is a four door configuration, however other configurations, such as a two door configuration, may be adopted to incorporate the disclosed concepts. Alternate configurations may include different pillar region references than the vehicle 10.

The first outer side panel 22 and the second outer side panel 23 are secured to the header 18 at respective regions referred to as forward box pillar regions of the truck box 14 or the C-pillar regions 24C herein. The tailgate 20 pivots between an open position and a closed position. In the closed position, each lateral end of the tailgate 20 may be removably attached to the first outer side panel 22 and the second outer side panel 23 at respective regions referred to as rear box pillar regions or the D-pillar regions 24D herein.

FIG. 2 is a fragmentary top view of an example of a portion of a pickup truck box. The pickup truck box includes a bed 40, an outer side panel 42, and a tailgate 44. The outer side panel 42 is mounted to the bed 40. The tailgate 44 is mounted to the bed 40 for pivotal movement. The tailgate 44 is shown in an open position in FIG. 2. A lock mechanism may secure the tailgate 44 to a D-pillar region of the pickup truck box. For example, the lock mechanism may include a striker located on the D-pillar region, a latch mechanism located on the tailgate 44, and a lockable check strap assembly 50. The check strap assembly 50 is secured to a D-pillar region of the pickup truck box and secured to the tailgate 44.

Referring additionally to FIGS. 3A and 3B, the check strap assembly 50 includes a check strap 52 and one or more members, such as a first sleeve 56 and a second sleeve 58. The check strap 52 includes a first end 60 and a second end 62. The first end 60 is removably mounted to the D-pillar region of the pickup truck box and the second end is removably mounted to the tailgate 44. The first end 60 and the second end 62 may each include an eye-hook to assist in mounting the check strap 52 to the D-pillar region and the tailgate 44. Fasteners, such as a bolt 65, may extend through the eye-hook to secure the first end 60 to the D-pillar region and the second end 62 to the tailgate. In another example, the second end 62 may include a striker for engagement with a latch mechanism of the tailgate 44. In yet another example, the first end 60 and the second end 62 may each include a keyway hole to receive a shoulder bolt.

The first sleeve 56 defines a channel sized to receive a portion of the check strap 52 and a portion of the second sleeve 58. For example, the second sleeve 58 may slide along runners (not shown) defined on an interior of the first sleeve 56. The check strap 52 defines a strap aperture 66. The first sleeve 56 defines a first aperture 68. The second sleeve 58 defines a second aperture 70. Aligning the strap aperture 66, the first aperture 68, and the second aperture 70 in substantial registration with one another forms a through-hole sized to receive a lock pin 76 of a lock mechanism. In one example, the strap aperture 66, the first aperture 68, and the second aperture 70 may be aligned with one another to define a through-hole sized to receive a portion of a lock to secure the first sleeve 56 and the second sleeve 58 to the check strap 52. This arrangement may assist in preventing removal of the tailgate 44 from the bed 40 when the tailgate 44 is in the open position.

Optionally, the check strap assembly 50 may include only one of the first sleeve 56 and the second sleeve 58. In this example with one sleeve, the sleeve may extend from the first end 60 to the second end 62. Either the first end 60 or the second end 62 may include an overhang to prevent access to a fastener securing the respective end to the D-pillar region or the tailgate 44. For example, an overhang 80 may extend from the first sleeve 56 to prevent access to the bolt 65 as shown in FIG. 3B. A similar overhang may also extend from the second sleeve 58 to prevent access to a fastener securing the second end 62 to the tailgate 44.

FIGS. 4 and 5 show another example of a lock assembly for a vehicle tailgate. FIG. 4 is a fragmentary top view of an example of a portion of a pickup truck box and a tailgate. FIG. 5 is a rear view of the example of the portion of the pickup truck box and the tailgate of FIG. 4. The pickup truck box includes a bed 104, an outer side panel 106, and a tailgate 108. The tailgate 108 is shown in an open position in FIGS. 4 and 5.

A flange 110 extends from a D-pillar region 112 of the pickup truck box and defines a through-hole 116 (best shown in FIG. 5). A member, such as a rod 120, may be mounted to the tailgate 108 and the D-pillar region 112 to secure the tailgate 108 in an open position. For example, the rod 120 includes a first end 124 for extending through the through-hole 116 and a second end 126 for securing to the tailgate 108. Now additionally referring to FIG. 6A, the second end 126 may include a striker 130 for engaging with a latch mechanism 132 of the tailgate 108 to prevent removal of the tailgate 108 from the pickup truck box when the tailgate 108 is in the open position. The rod 120 may be of a material such as steel or aluminum. The latch mechanism 132 may be a mechanism used to secure the tailgate 108 to a striker of the D-pillar region 112 when the tailgate 108 is in a closed position.

Optionally, the second end 126 may include an angled portion 140 as shown in FIG. 6B to accommodate various size relationships between the D-pillar region 112 and a location of the latch mechanism 132 of the tailgate 108.

Optionally, the rod 120 may have a telescoping feature to accommodate various sizes of D-pillar regions and tailgates. For example, the rod 120 may extend and retract between at least two configurations to accommodate at least two different size relationships between D-pillar regions and tailgates. The rod 120 may include an overhang 150 to prevent access to the striker 130 and the latch mechanism 132.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pickup truck box assembly comprising:
a pickup truck box;
a tailgate mounted for pivotal movement to the pickup truck box and including a latch mechanism;
a check strap including a first end for securing to a D-pillar of the pickup truck box and a second end including a striker for engaging with the latch mechanism, and defining a first aperture;
a first sleeve defining a first channel to receive a portion of the check strap and a second aperture for substantial registration with the first aperture; and
a lock mechanism for securing to the check strap and the first sleeve,
wherein the first sleeve is sized for arrangement with the check strap so that the apertures align to receive a portion of the lock mechanism to prevent removal of the tailgate from the pickup truck box.

2. The assembly of claim 1 further comprising a second sleeve defining a second channel to receive another portion of the check strap and a third aperture for registration with the first aperture and the second aperture, wherein the second sleeve is sized for partial insertion within the first sleeve.

3. The assembly of claim 2, wherein the first sleeve and the second sleeve are arranged with one another in a telescoping relationship.

4. The assembly of claim 1, wherein the first end of the check strap includes an eye-hook for receiving a fastener to secure the first end to the D-pillar.

5. The assembly of claim 1, wherein one of the ends of the first sleeve includes a flange overhang to prevent access to a fastener securing the first end of the check strap to the D-pillar or the striker securing the second end of the check strap to the latch mechanism of the tailgate.

6. The assembly of claim 1, wherein the first and second apertures are sized to receive a lock pin of the lock mechanism to prevent removal of the first sleeve from the check strap.

7. A pickup truck tailgate assembly comprising:
a truck box having a D-pillar including a flange defining a through-hole;
a tailgate mounted to the truck box for pivotal movement and including a latch mechanism; and
a rod including a first end for inserting through the through-hole and a second end including a rod striker for engagement with the latch mechanism to prevent removal of the tailgate from the truck box when in an open position.

8. The assembly of claim 7, wherein the rod further includes a telescoping feature for extension and retraction between at least two configurations.

9. The assembly of claim 7, wherein the second end of the rod is adjustable for engagement alignment with various locations of the latch mechanism.

10. The assembly of claim 7, wherein the second end of the rod includes an angled portion to accommodate different size relationships of the D-pillar and the tailgate.

11. The assembly of claim 7, wherein the rod is one of steel and aluminum.

12. The assembly of claim 7, wherein the D-pillar further includes a D-pillar striker for engagement with the latch mechanism of the tailgate when the tailgate is in a closed position.

13. The assembly of claim 7, wherein the second end of the rod further includes a flange overhang to prevent access to the rod striker.

14. A check strap assembly for a pickup truck tailgate comprising:
a truck bed;
a tailgate mounted to the truck bed for pivotal movement;
opposing side panels secured to the truck bed to partially define a truck box when the tailgate is in a closed position; and
a check strap assembly including a member extending from a D-pillar of the truck box to the tailgate and a lock mechanism having a component with an overhang to prevent access to a fastener securing the member to the D-pillar or the tailgate.

15. The assembly of claim 14, wherein the D-pillar includes a flange defining an aperture, and wherein the member is a rod having a first end sized for extending through the aperture and a second end with a striker for engagement with a latch mechanism of the tailgate.

16. The assembly of claim 14, wherein the component with an overhang is a rod in which the overhang extends from the rod to prevent access to a rod striker for securing to a latch mechanism of the tailgate.

17. The assembly of claim 14, wherein the member is a check strap extending from the D-pillar to the tailgate and the component with an overhang is a first sleeve sized for receiving at least a portion of the check strap, and wherein the overhang extends from the first sleeve to prevent access to a fastener for securing a first end of the check strap to the D-pillar or a second end of the check strap to the tailgate.

18. The assembly of claim 17 further comprising a second sleeve sized for partial disposal within the first sleeve and to receive a portion of the check strap, wherein the first sleeve, the second sleeve, and the check strap each define separate apertures for alignment with one another to receive a portion of a lock mechanism.

19. The assembly of claim 18, wherein the first sleeve and the second sleeve are arranged with one another in a telescoping relationship.

* * * * *